(12) United States Patent
Chen et al.

(10) Patent No.: US 11,601,857 B2
(45) Date of Patent: Mar. 7, 2023

(54) METHOD FOR PROVIDING STEERING IN A WI-FI NETWORK

(71) Applicant: ARRIS Enterprises LLC, Suwanee, GA (US)

(72) Inventors: LiDan Chen, Guangdong (CN); Haokeng Yu, Guangdong (CN); Tao Peng, Guangdong (CN); ZiJie Chen, Guangdong (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/703,103

(22) Filed: Mar. 24, 2022

(65) Prior Publication Data

US 2022/0217603 A1 Jul. 7, 2022

Related U.S. Application Data

(63) Continuation of application No. 16/765,673, filed as application No. PCT/CN2017/118092 on Dec. 22, 2017, now Pat. No. 11,317,330.

(51) Int. Cl.
*H04B 17/318* (2015.01)
*H04W 36/08* (2009.01)
(Continued)

(52) U.S. Cl.
CPC .......... *H04W 36/08* (2013.01); *H04B 17/318* (2015.01); *H04W 36/0016* (2013.01); *H04W 36/30* (2013.01); *H04W 84/12* (2013.01)

(58) Field of Classification Search
CPC . H04W 36/08; H04W 36/0016; H04W 36/30; H04W 84/12; H04W 36/00835; H04B 17/318
(Continued)

(56) References Cited

U.S. PATENT DOCUMENTS 8,107,457 B2 * 1/2012 White .................. H04W 76/15
455/442
8,527,768 B2 * 9/2013 Tsai ...................... H04W 12/06
713/169
(Continued)

FOREIGN PATENT DOCUMENTS

CN  105263154  1/2016
CN  106921974  7/2017
(Continued)

OTHER PUBLICATIONS

International Search Report dated Sep. 13, 2018 in International (PCT) Application No. PCT/CN2017/118092.
(Continued)

*Primary Examiner* — Amancio Gonzalez
(74) *Attorney, Agent, or Firm* — Wenderoth, Lind & Ponack, L.L.P.

(57) ABSTRACT

Various implementations described herein are directed to technologies for providing steering for devices of a Wi-Fi network. A steering operation to hand off a client from a first device of the Wi-Fi network to a qualified second device of the Wi-Fi network is initiated based on a performance factor. The steering operation from the first device to the second device is performed in a manner that avoids packet loss.

20 Claims, 15 Drawing Sheets

(51) Int. Cl.
*H04W 36/00* (2009.01)
*H04W 36/30* (2009.01)
*H04W 84/12* (2009.01)

(58) Field of Classification Search
USPC ........................................................ 370/520
See application file for complete search history.

(56) References Cited

U.S. PATENT DOCUMENTS

| | | | | |
|---|---|---|---|---|
| 9,237,499 | B2* | 1/2016 | Kuhn | H04W 36/08 |
| 9,756,450 | B1* | 9/2017 | Carrera | H04W 12/041 |
| 10,225,777 | B2* | 3/2019 | Singh | H04W 36/16 |
| 10,368,255 | B2* | 7/2019 | Gunasekara | H04B 17/318 |
| 10,645,588 | B2* | 5/2020 | Mahoney | H04W 16/12 |
| 10,687,226 | B2* | 6/2020 | Bahr | H04W 24/02 |
| 10,798,631 | B2* | 10/2020 | Agarwal | H04W 36/22 |
| 10,959,148 | B2* | 3/2021 | Strater | H04W 36/0058 |
| 11,317,330 | B2* | 4/2022 | Chen | H04B 17/318 |
| 2006/0121883 | A1 | 6/2006 | Faccin | |
| 2011/0243013 | A1 | 10/2011 | Lee et al. | |
| 2014/0003263 | A1* | 1/2014 | Sheriff | H04W 48/20 370/252 |
| 2014/0307708 | A1 | 10/2014 | Son et al. | |
| 2015/0358830 | A1* | 12/2015 | Bajko | H04W 4/029 370/254 |
| 2016/0183159 | A1* | 6/2016 | Cui | H04W 36/0058 370/329 |
| 2016/0212745 | A1* | 7/2016 | Hiertz | H04W 16/32 |
| 2017/0156049 | A1* | 6/2017 | Bergström | H04W 28/0226 |
| 2017/0273013 | A1* | 9/2017 | Edara | H04W 48/20 |
| 2022/0086729 | A1* | 3/2022 | Shaw | H04W 36/36 |

FOREIGN PATENT DOCUMENTS

| | | |
|---|---|---|
| EP | 2 019 518 | 1/2009 |
| EP | 1 647 110 | 6/2012 |
| EP | 2 744 267 | 6/2014 |
| EP | 3 096 558 | 11/2016 |
| EP | 2 853 113 | 10/2017 |
| WO | 2005/006785 | 1/2005 |
| WO | 2013/175048 | 11/2013 |

OTHER PUBLICATIONS

Extended European Search Report dated Jun. 14, 2021 in European Application No. 17935766.0.
Communication pursuant to Article 94(3) dated Apr. 8, 2022 in European Application No. 17 935 766.0.
Mohamed Kassab et al., "Securing fast handover in WLANs: a ticket based proactive authentication scheme", pp. 1-6, published Nov. 1, 2007, XP031207063.

* cited by examiner

```
<?xml version="1.0" encoding="US-ASCII"?>
<X_ARRIS_COM>
<tr1811/>
<Device.X_ARRIS_COM_HNE.ConfigurationId>F42773</Device.X_ARRIS_COM_HNE.ConfigurationId>
<Device.WiFi.SSID.10001.SSID>ARRIS-KIM-TEST</Device.WiFi.SSID.10001.SSID>
<Device.WiFi.AccessPoint.10001.Security.PairwiseTransientKey>BSN3333900378</Device.WiFi.AccessPoint.10001.Security.PairwiseTransientKey>
<Device.WiFi.AccessPoint.10001.AssociatedDevice.MACAddress>EB:32:98:34:08:D4</Device.WiFi.AccessPoint.10001.AssociatedDevice.MACAddress>
</tr1811>
</X_ARRIS_COM>
```

METHOD FOR PROVIDING STEERING IN A WI-FI NETWORK

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Typical access points allow clients to associate with the access point when a received signal strength indicator is within a certain range. However, this association may cause poor performance for edge devices and degrade system performance. This degradation in system performance is especially apparent in edge devices within a band coverage edge that have not reached the point where a trigger is received to disassociate with the access point.

SUMMARY

Described herein are implementations of various technologies of a method for providing steering for devices of a Wi-Fi network. A steering operation to hand off a client from a first device of the Wi-Fi network to a qualified second device of the Wi-Fi network is initiated based on a performance factor. The steering operation from the first device to the second device is performed in a manner that avoids packet loss.

The performance factor can be a link quality indicator such as signal strength indicator (RSSI). Steering can be initiated when an RSSI of the first device is below a threshold.

Packet loss can be avoided by sending a pairwise transient key (PTK) from the first device to the second device. The PTK allows the second device to handle traffic for the client.

In one implementation, the first device can be a gateway access point and the second device can be a wireless extender. In another implementation, the first device may be a wireless extender, and the second device may be a gateway access point.

When a probe request received by the first device from the client, the first device sends a probe response in response to receive the probe request from the client. The first device may push a client media access control address to the second device via extensible markup language (XML). The first device determines whether to push a pairwise transient key to the second device via XML.

Also described herein are implementations of various technologies of a device for providing steering in a Wi-Fi network. A network device of the Wi-Fi network may be configured to: initiate a steering operation to handoff a client from the network device to a qualified device of the Wi-Fi network based on a performance factor; and perform the steering operation from the network device to the qualified device based on a performance factor in a manner that avoids packet loss.

In various implementations, the network device may be a gateway access point and the qualified device may be a wireless Ethernet coaxial bridge, a router, and/or a Wi-Fi extender. In various other implementations, the network device may be a wireless Ethernet coaxial bridge, a router, or a Wi-Fi extender and the qualified device may be a gateway access point.

Further described herein are implementations of various technologies of a non-transitory computer-readable medium having stored thereon a plurality of computer-executable instructions which, when executed by a computer, cause the computer to: initiate a steering operation to handoff a client from a first device of a Wi-Fi network to a qualified second device of the Wi-Fi network based on a performance factor; and perform the steering operation from the first device to the second device in a manner that avoids packet loss.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

FIG. 11 illustrates an example XML file in accordance with implementations of various techniques described herein.

DETAILED DESCRIPTION

One or more implementations of various techniques for providing steering for devices of a Wi-Fi network will now be described in more detail with reference to FIGS. 1-15 in the following paragraphs.

Figure 1:
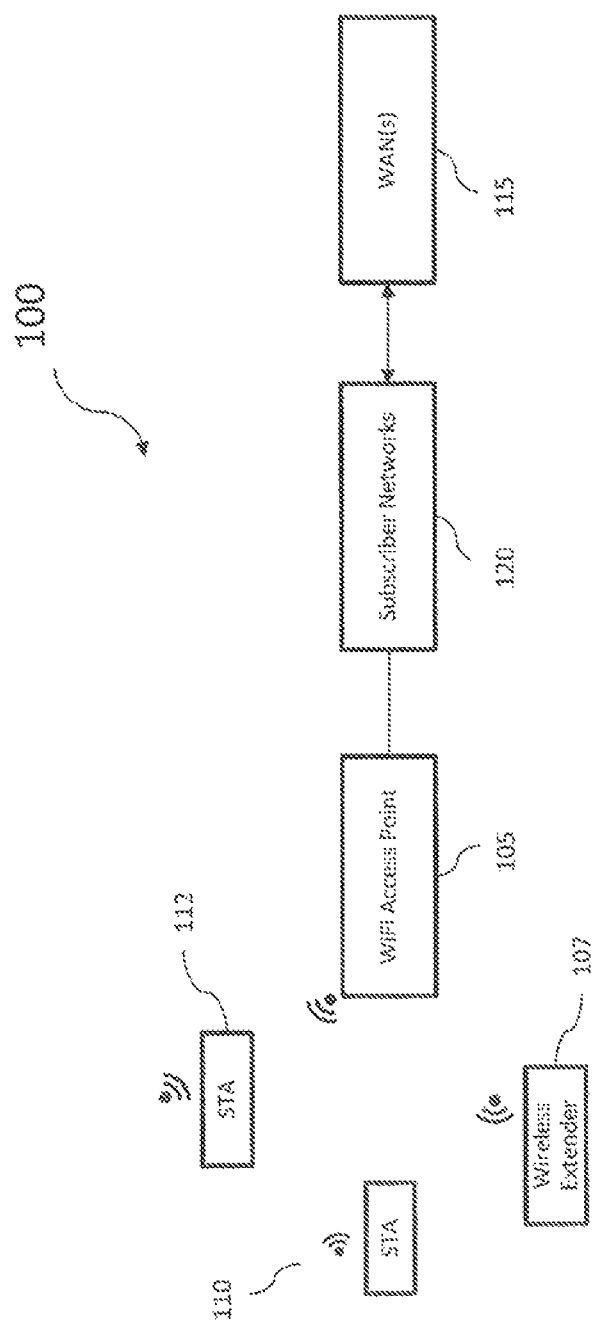
FIG. 1 illustrates an example network environment in accordance with implementations of various techniques described herein.

FIG. 1 is a block diagram Illustrating an example network environment 100 for providing steering. A Wi-Fi access point can be cable gateway, Wi-Fi router, Wi-Fi set top box (STB), etc. All devices with a Wi-Fi connection can be a client device (STA), such as mobile devices, wireless extenders, etc.

Multiple services may be delivered to CPE devices over one or more local networks. For example, a local network may be provided by a gateway device, and the multiple services may be delivered to one or more CPE devices by the gateway device. Local network(s) may include a coaxial network, a local area network (LAN), wireless local area network (WLAN), personal area network (PAN), Multimedia over Coax Alliance (MoCA) network, mobile hotspot network, and others, it should be understood that the Wi-Fi Access Point 105 may receive services from and may output upstream communications to an access point (e.g., gateway device, modem, router, wireless extender, etc.) over a wired or wireless connection to the access point.

Multiple services may be delivered to a subscriber premise from a wide-area network (WAN) 115 through a subscriber network 120. The subscriber network 120 may include, for example, a hybrid fiber-coaxial (HFC) network, fiber network, mobile network, satellite network, and any other network operable to deliver services to a subscriber premise.

Content may be received at the Wi-Fi Access Point 105. For example, the content may be delivered to the Wi-Fi Access Point 105 as packets or frames, and the packets or frames may be decoded and processed for presentation to a user through a connected display device (e.g. client device or STA 110, 112). Wireless extender 107 may also be used to provide Wi-Fi service to client devices 110, 112.

The WiFi access points may be configured to receive content from a plurality of content or service providers. For example, the Wi-Fi access points may receive content from a plurality of different subscriber networks 120 (e.g., a head end of a cable network, satellite network, etc.) and/or WANs 115. Content streams received from different service providers may be received at the Wi-Fi Access Point 105 in different formats.

Figure 2:
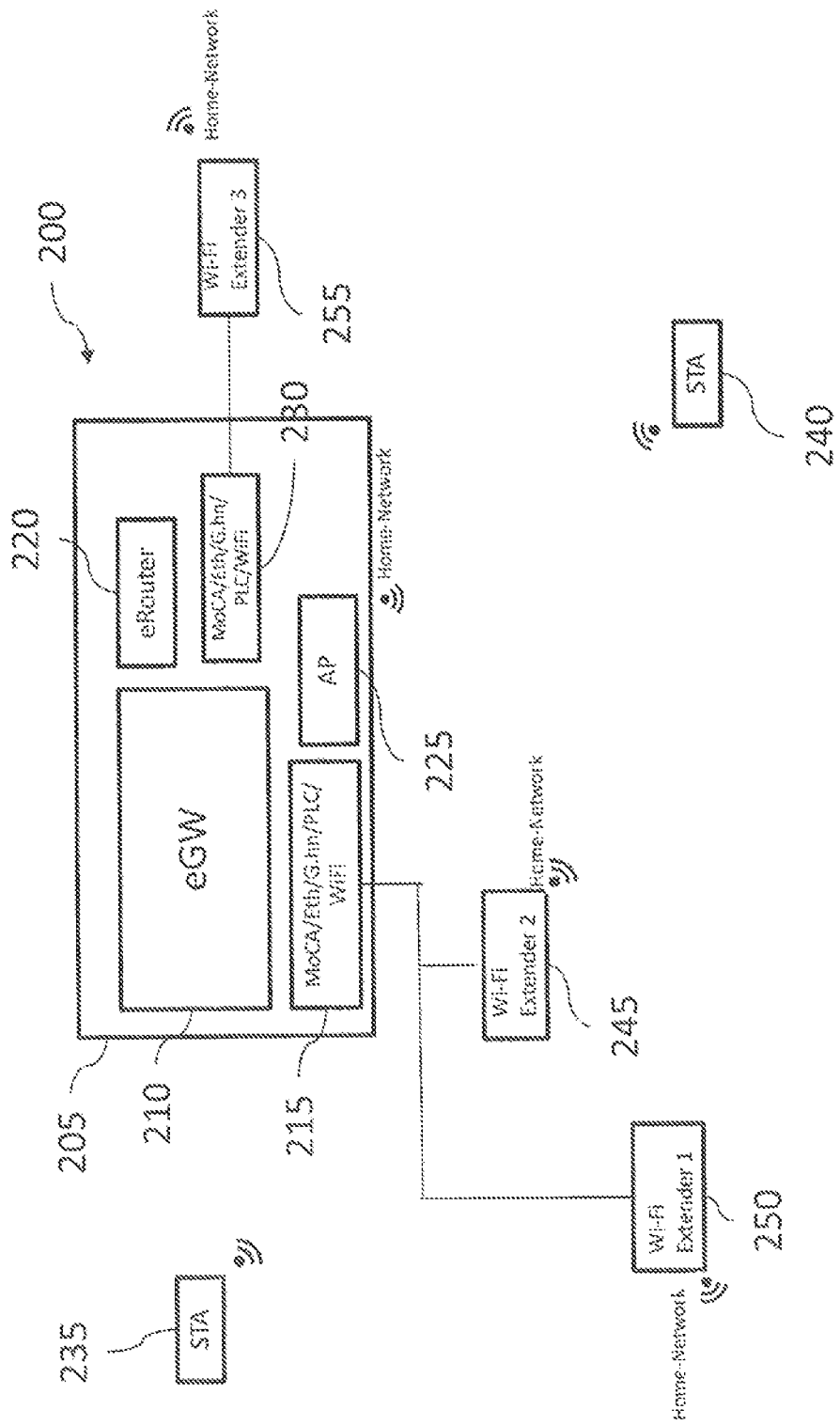
FIG. 2 illustrates an example home network in accordance with implementations of various techniques described herein.

FIG. 2 illustrates an implementation of a home network according to one implementation. Home network 200 includes device 205, stations or client devices 235, 240 and wireless extender (WE) 245, 250, 255. Device 205 may be connected to a headend, e.g., a headend of subscriber network 120. Device 205 includes a gateway (eGW 210), a multimedia over coaxial (MoCA) module 215, a router (eRouter 220), an access point 225 and an Ethernet module 230. In this implementation Wi-Fi can be provided to stations 235, 240 directly via device 205 through access point 225, via Ethernet module 230 using wireless extender 255, or via MoCA module 215 using wireless extenders 245, 250. In one implementation, device 205 may be implemented in Wi-Fi access point 105. In ore implementation, client device 235 may be implemented in any devices with Wi-Fi service 110. Although modules 215 and 230 are described as MoCA and Ethernet modules, respectively, these modules may also be implemented as MoCA, Ethernet, G.hn, powerline communication (PLC), and/or Wi-Fi modules.

Figure 3:
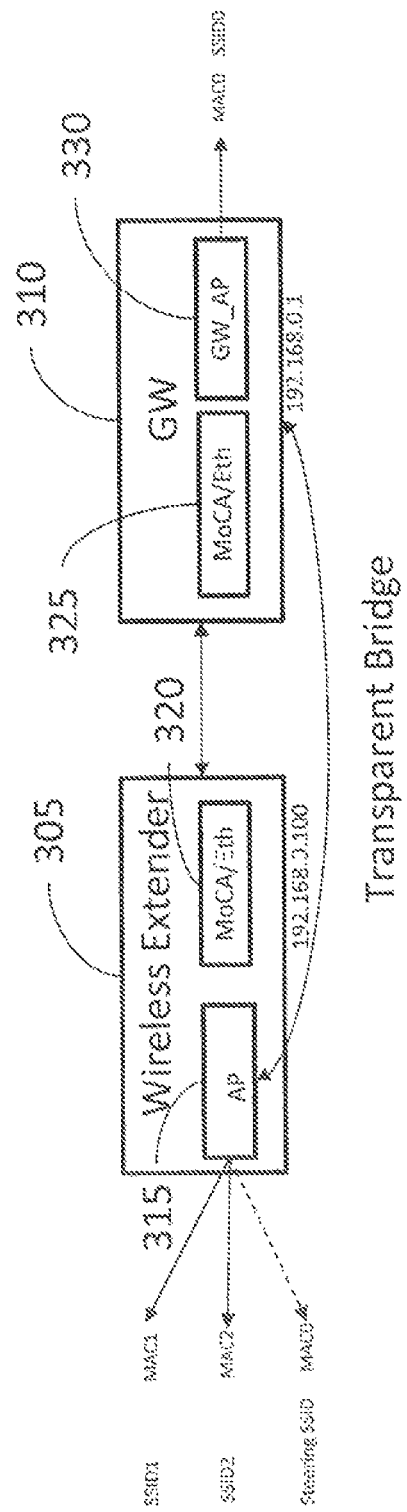
FIG. 3 illustrates a transparent bridge in accordance with implementations of various techniques described herein.

FIG. 3 illustrates an implementation of a transparent bridge between a wireless extender 305 and a gateway 310. The wireless extender 305 includes an access point 315 and a MoCA and/or Ethernet interface 320. The gateway 310 also includes a MoCA and/or Ethernet interface 325 and an access point 330. In one implementation, the wireless extender 305 and the gateway 310 can each have up to eight different access identifiers. Each of the access identifiers can be treated as different wireless networks. In this implementation wireless extender 305 has three media access control (MAC) addresses (MAC0, MAC1, MAC2), where each MAC address has a corresponding service set identifier (SSID) (Steering SSID, SSID1, SSID2). The gateway 310 of this implementation has one MAC address (MAC0) with a corresponding SSID (SSID0). The bridge between the wireless extender 305 and gateway 310 is a transparent bridge because the access identifier(s) or MAC address(es) of the wireless extender 305 are unknown to the gateway 310. Likewise, the access identifier(s) or MAC address(es) of the gateway 310 are unknown to the wireless extender 305. Thus, in this implementation, the wireless extender 305 can broadcast a new SSID, e.g., Steering SSID, with an access point MAC address without any issues because the MAC address of the wireless extender access point 315 is unknown to gateway 310.

Figure 4:
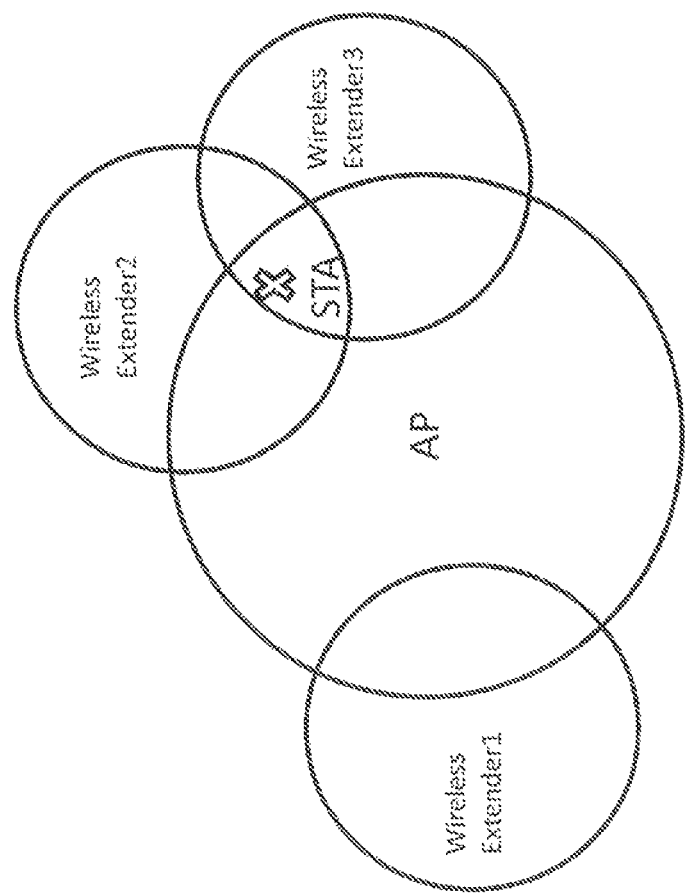
FIG. 4 illustrates a diagram of example Wi-Fi signal edge coverage in accordance with implementations of various techniques described herein.

FIG. 4 illustrates a diagram of example Wi-Fi signal edge coverage according to one implementation. The station (STA), e.g., client, is moving into access point (AP) Wi-Fi signal edge coverage. In prior systems, the received signal strength indicator (RSSI) and the modulation and coding scheme (MCS) index of the station could be very low, however, the Wi-Fi connection for the station would remain even though the connection is performing poorly. In worst case scenarios, the station simply disconnects from the poorly performing Wi-Fi connection. The present disclosure provides a way to handoff the station to an access point that provides better Wi-Fi connection performance, e.g., a connection having higher RSSI and MCS values.

Figure 5:
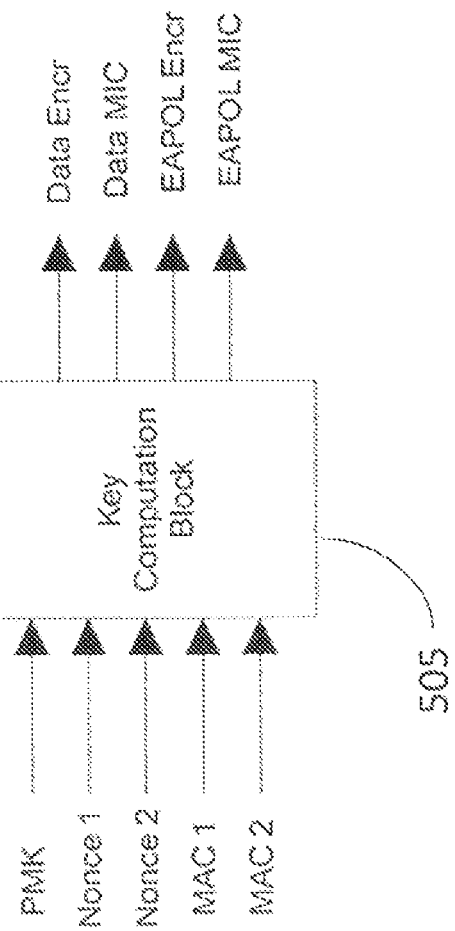
FIG. 5 illustrates a diagram of an example pairwise transient key generator in accordance with implementations of various techniques described herein.

FIG. 5 illustrates a diagram of an example pairwise transient key (PTK) generator. Key computation block utilizes a 4-way hash process to generate a password for a wireless network. Key computation block 505 receives a pairwise master key (PMK) (or a preshared key (PSK)), a nonce from each device (Nonce 1, Nonce 2), the MAC address of each device (MAC1, and MAC 2) as inputs. Key computation block 505 uses these inputs to generate four keys: a data encryption key (Data Encr), Data message integrity code (Data MIC), extensible authentication protocol over LAN key (EAPOL Encr), and an extensible authentication protocol over LAN message integrity code (EAPOL MIC). Each device, e.g., the present device and the device to which a station is being handed off, generates a nonce and passes its nonce to the other device. Keys are generated by including both nonces in the computation. To ensure that the identity of each device is bound into the keys, the MAC address of each device is included in the computation. If the MAC address is not changed for both the station and the access point, the PTK won't be changed. PTK is used for data encryption and decryption. In this example, Nonce 1 may also be referred to as ANonce, Nonce 2 may also be referred to as SNonce, MAC 1 may also be referred to as an Authenticate MAC, and MAC 2 may also be referred to as a Supplicant Mac.

Figure 6:
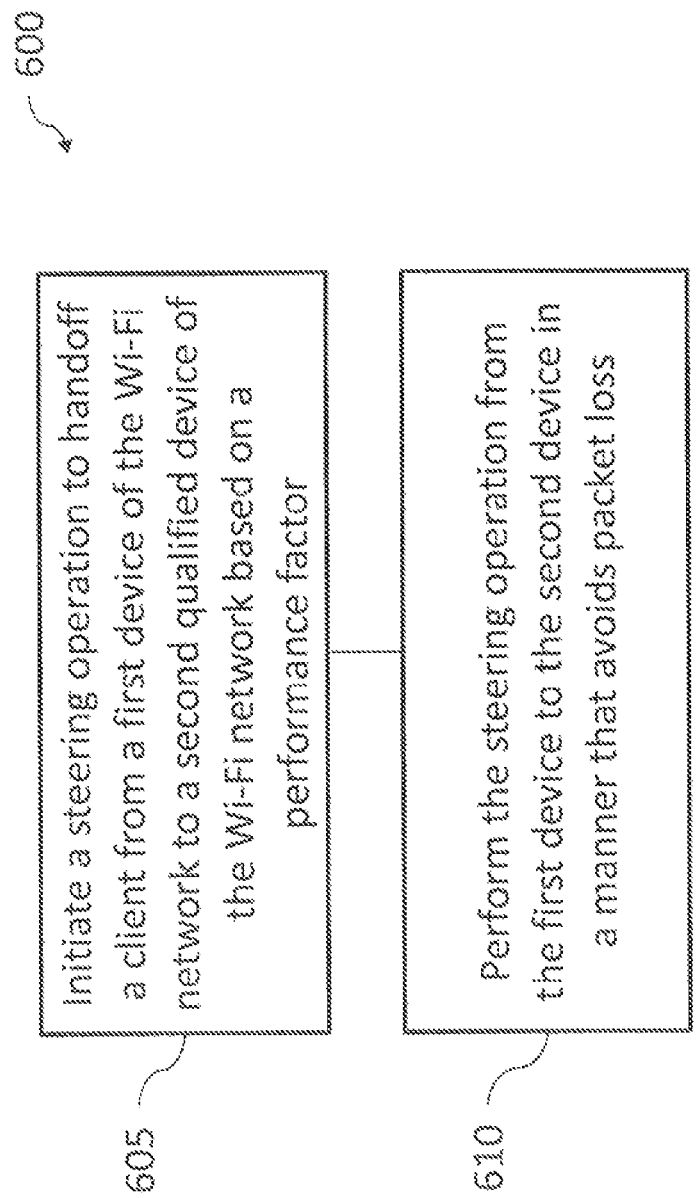
FIG. 6 illustrates a block diagram of a method for providing steering for devices of a Wi-Fi network in accordance with implementations of various techniques described herein.

FIG. 6 illustrates a block diagram of a method 600 for providing steering for devices of a Wi-Fi network. At block 606, a steering operation to handoff a client from a first device of the Wi-Fi network to a qualified second device of the Wi-Fi network is initiated based on a performance factor. The performance factor may include RSSI. Although only RSSI is described in this disclosure, other link quality indicators such as Packet Error Rate and channel utilization can be used to determine when to steer. A qualified second device can be determined using the method of FIG. 7 or FIG. 8.

Figure 7:
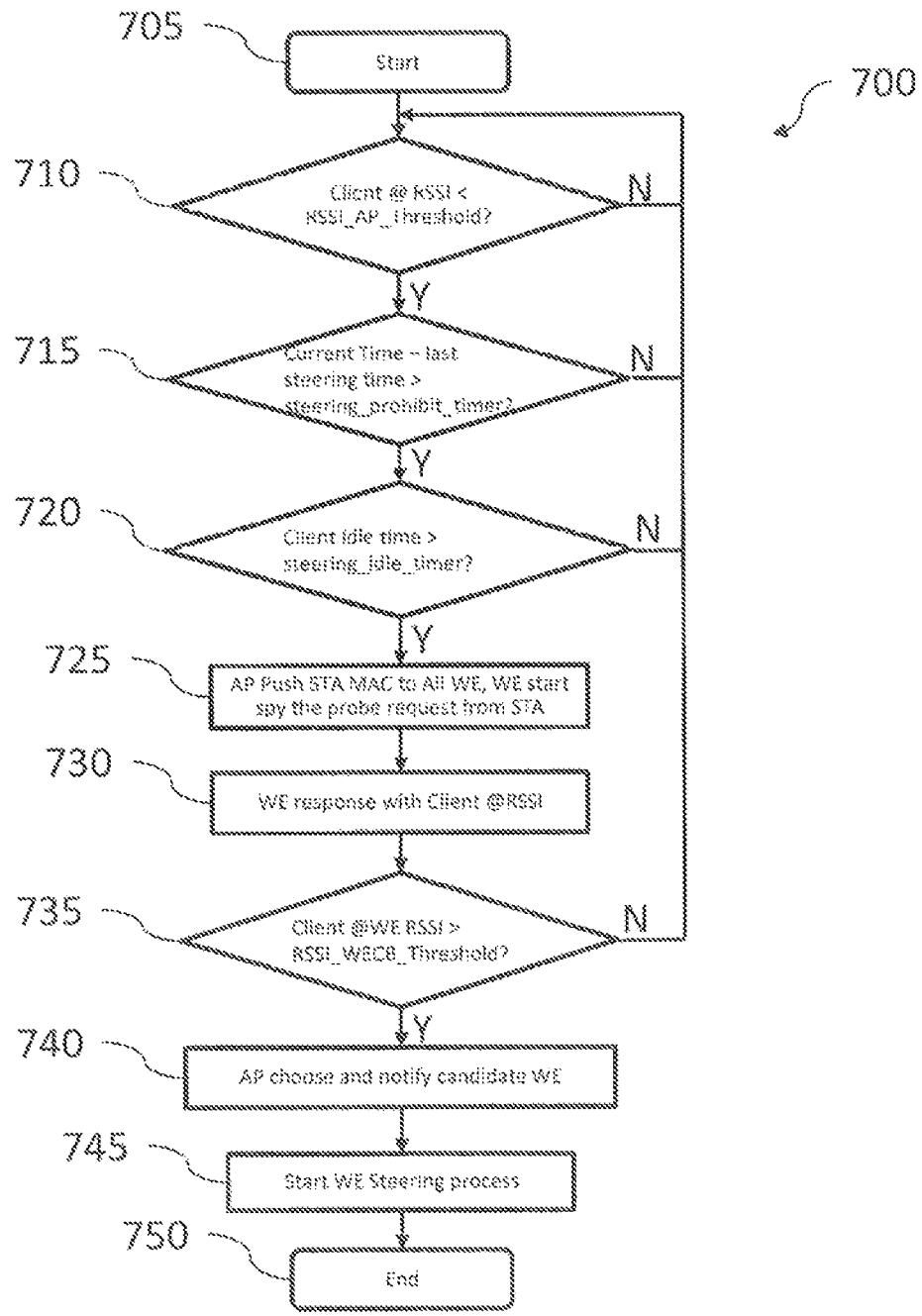
FIG. 7 illustrates a block diagram of a method for determining a qualified device for steering in accordance with implementations of various techniques described herein.

FIG. 7 illustrates a block diagram of a method 700 for a determining a qualified device for steering e.g., from an AP of the gateway to a wireless extender. Although the present method describes an AP to wireless extender configuration, the present method may also be utilized in conjunction with AP to router configurations. Method 700 begins at block 705.

At block 710, a determination is made as to whether the RSSI of a client is lower than a predefined threshold. In one implementation, the predefined threshold is −75 dB. The method proceeds to block 715 when the RSSI is lower than the threshold and proceeds to block 705 when the RSSI is greater than the threshold. In one implementation, the RSSI threshold can be defined on a per user basis. In another implementation, the RSSI threshold can be a value between −75 dB and −90 dB.

At block 715, a determination is made as to whether a steering process has recently occurred. This check is provided to a ping-pong effect where the client is steered multiple times within a short time period. In one implementation, the difference of a current time and a last steering time is compared to a steering prohibit timer threshold. The method proceeds to block 705 when the difference is less than the steering prohibit timer threshold and proceeds to block 720 when the difference is greater than the steering prohibit timer threshold. In one implementation, the prohibit timer threshold can be defined on a per user basis. In one implementation, the prohibit timer threshold can be a value between 5 and 10 minutes.

At block 720, a determination is made as to whether the client has real-time traffic, in one implementation, a client idle time is compared to a steering idle timer. The method proceeds to block 725 when the client idle time is greater than a steering idle timer and proceeds to block 705 when the client idle time is less than or equal to a steering idle timer. In one implementation, the steering idle timer can be defined on a per user basis. In another implementation, the steering idle timer can be a value between 3 and 10 seconds.

At block 725, the client MAC address is pushed to one or more wireless extenders via a MoCA/Ethernet/G.hn/PLC/Wi-Fi connection in xml format to query RSSI information. This is accomplished using an auto-push procedure. An auto push occurs when the Wi-Fi access point provides an updated configuration to the wireless extender using a HTTP-S PUT message with XML embedded. An auto push may also occur when the wireless extender sends an updated configuration to the Wi-Fi Access point. Each wireless extender receives the client's broadcasting probe requests over the air and determines the RSSI of the client device.

At block 730, each wireless extender responds to the AP of the gateway with the RSSI Information in xml format. At block 735, a determination is made as to whether any of the one or more wireless extenders is qualified. The method proceeds to block 740 for each qualified wireless extender when the RSSI of the client as measured by each wireless extender is greater than the RSSI wireless extender threshold. If the measured RSSI of the client for each wireless extender is less than the RSSI wireless extender threshold, the method proceeds to block 700. The RSSI threshold value can be defined per user. In one implementation, the RSSI threshold value can be between −50 dB and −75 dB.

At block 740, the AP chooses the best candidate from the one or more qualified wireless extenders. At block 745, die steering process is started. Once a wireless extender has been qualified for steering, method 700 ends at block 750 and method 900, as described below, begins.

Figure 8:
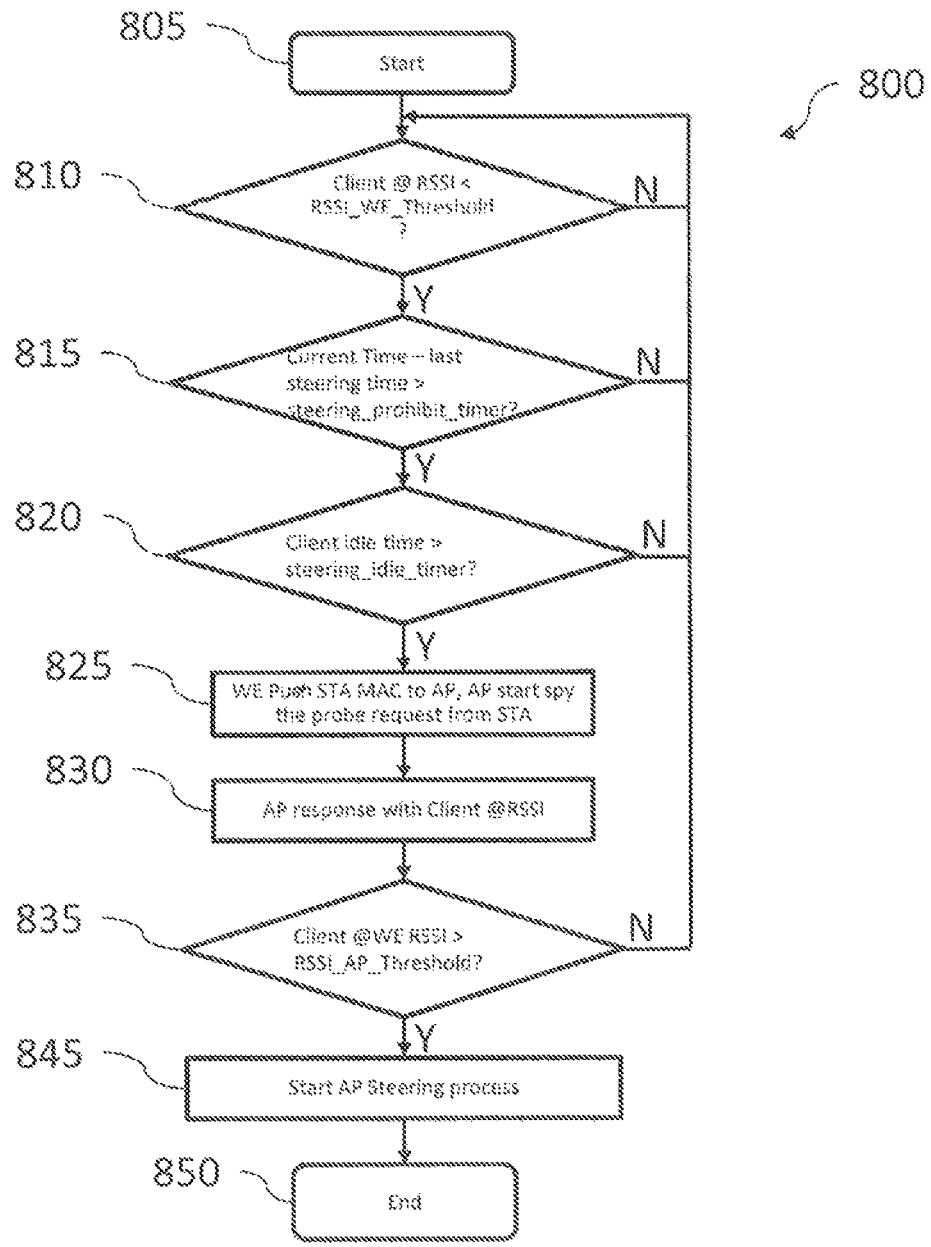
FIG. 8 illustrates a block diagram of a method for determining a qualified device for steering in accordance with implementations of various techniques described herein.

FIG. 8 illustrates a block diagram of a method 800 for determining a qualified device for steering, e.g. from a wireless extender to an AP of a gateway. Although the present method describes a wireless extender to AP configuration, the present method may be utilized in conjunction with router to AP and Wi-Fi extender to AP configurations. Method 800 begins at block 805.

At block 810, a determination is made as to whether the RSSI of a client is lower than a predefined threshold. In one implementation, the predefined threshold is −75 dB. The method proceeds to block 815 when the RSSI is lower than the threshold and proceeds to block 805 when the RSSI is greater than the threshold. The RSSI threshold can be defined for user. In one implementation, the RSSI threshold may be a value between −75 dB and −90 dB.

At block 815, a determination is made as to whether a steering process has recently occurred. This check is provided to a ping-pong effect where the client is steered multiple times within a short time period. In one implementation, the difference of a current time and a last steering time is compared to a steering prohibit timer threshold. The method proceeds to block 805 when the difference is less than the steering prohibit timer threshold and proceeds to block 820 when the difference is greater than the steering prohibit timer threshold. The steering prohibit timer threshold can be defined per user. In one implementation, the steering prohibit timer threshold can be a value between 5 and 10 minutes.

At block 820, a determination is made as to whether the client has real-time traffic. In one implementation, a client idle time is compared to a steering idle timer. The method proceeds to block 825 when the client idle time is greater than a steering idle timer and proceeds to block 805 when the client idle time is less than or equal to a steering idle timer. The steering idle timer can be defined per user. In one implementation, the steering idle timer can be a value between 3 and 10 seconds.

At block 825, the client MAC address is pushed to the AP of the gateway via a MoCA/Ethernet/G.hn/PLC/Wi-Fi connection in xml format to query RSSI information. This is accomplished using an auto-push procedure. An auto push occurs when the Wi-Fi access point provides an updated configuration to the wireless extender using a HTTP-S PUT message with XML embedded. As described above, an updated configuration can be provided to the Wi-Fi access point from the wireless extender in the same manner. The AP receives the client's broadcasting probe requests over the air and determines the RSSI of the client device.

At block 830, the AP responds to the wireless extender With the RSSI information in extensible markup language (XML) format. At block 835, a determination is made as to whether the AP is qualified. The method proceeds to block 845 when the RSSI of the client as measured by AP is greater than the RSSI AP threshold, if the measured RSSI of the client for the AP is less than the RSSI AP threshold, the method proceeds to block 805. The RSSI threshold can be defined per user. In one implementation, the RSSI threshold can be a value between −50 dB and −75 dB.

At block 845, the steering process is started. Once the AP has been qualified for steering, method 800 ends at block 850 and method 1000, as described below, begins.

Returning to FIG. 6, at block 610, a steering operation from the first device to the second device is performed in a manner that avoids packet loss, e.g., by using a pairwise transient key (PTK). In one implementation, packet loss is avoided by sending a PTK from the first device to the second device. The PTK allows the second device to handle traffic for the client. Using PTK In this manner eliminates the need for a four-way handshake process to handoff a client from the first device to the second device. The four-way process is not an ideal process for steering since there is a possibility that some information, e.g., data packets, may be lost. Steering from a first device to a second device can be performed using the method of FIG. 9 or FIG. 10.

Figure 9:
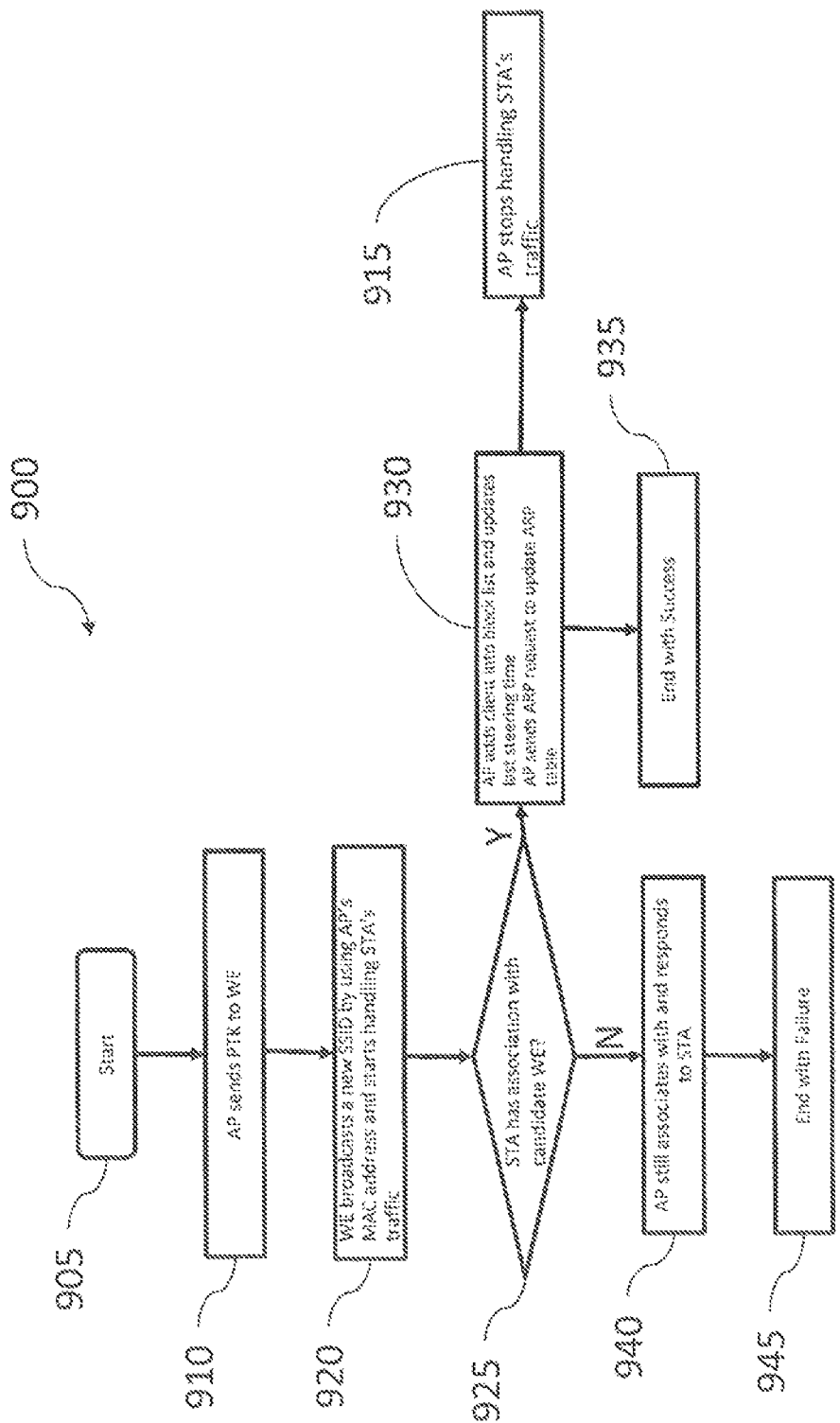
FIG. 9 Illustrates a block diagram of a method for performing steering in accordance with implementations of various techniques described herein.

FIG. 9 illustrates a block diagram of a method 900 for performing steering, e.g., from a gateway AP to a wireless extender. Although the present method describes an AP to wireless extender configuration, the present method may also be utilized in conjunction with AP to router configurations. In one implementation, once the qualified wireless extender has been determined as described above in the description of FIG. 7, method 800 begins at block 905.

At block 910, the AP sends the client's PTK to the wireless extender to bypass the 4-way handshake process for seamless association. At block 915, the AP stops handling the client's traffic.

At block 920, the wireless extender broadcasts a new SSID by using the AP s MAC address and starts handling the client s traffic without packet loss. Regardless of whether the client is associated with the wireless extender or the AP, the client is hosted on the same eRouter module. In addition, MAC, IP, and network address translation (NAT) tables are not changed.

At block 925, a determination is made as to whether a client is capable of being steered to the wireless extender. If the client is capable of being steered to the wireless extender, at block 930, the gateway AP deletes the client from the client list, adds the client into a block list, and updates a last steering time. The gateway then sends an address resolution protocol (ARP) request to update an ARP subsystem interface. At block 935, the steering method ends successfully.

If the client is not capable of being steered to the wireless extender, at block 940, the gateway AP remains associated with the client and continues to respond to the client. At block 945, the steering method ends with a failure.

Figure 10:
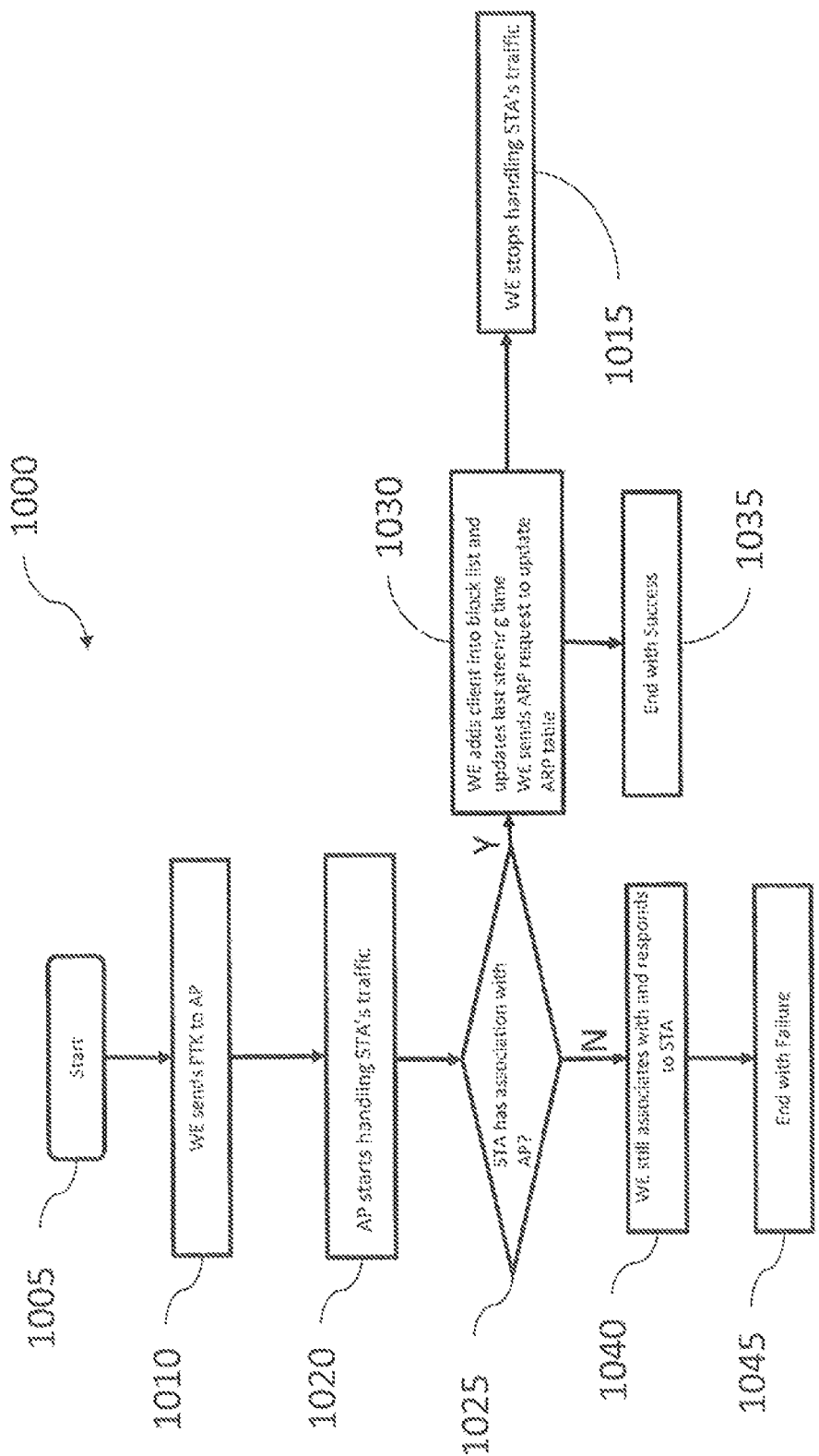
FIG. 10 illustrates a block diagram of a method for performing steering in accordance with implementations of various techniques described herein.

FIG. 10 illustrates a block diagram of a method 1000 for performing steering, e.g., from a gateway wifeless extender to a gateway AP. Although the present method describes a wireless extender to AP configuration, the present method may also be utilized in conjunction with router to AP configurations. In one implementation, once the gateway AP has been qualified as described above in the description of FIG. 8, method 1000 begins at block 1005.

At block 1010, the wireless extender sends the client's PTK to the gateway AP to bypass the 4-way handshake process for seamless association.

At block 1020, the gateway AP broadcasts with its own MAC0 and starts handling the client's traffic without packet loss. Regardless of whether the client is associated with the AP or the wireless extender, the client is hosted on the same eRouter module. In addition, MAC, IP, and network address translation (NAT) tables are not changed.

At block 1025, a determination is made as to whether a client is capable of being steered to the AP. If the client is capable of being steered to the AP, at block 1030, the wireless extender deletes the client from the client list, adds the client into a block list, and updates a last steering time. The wireless extender then sends an address resolution protocol (ARP) request to update an ARP subsystem interface. At block 1015, the wireless extender stops handling the client's traffic. At block 1035, the steering method ends successfully.

If the client is not capable of being steered to the AP, at block 1040, the wireless extender remains associated with the client and continues to respond to the client. At block 1045, the steering method ends with a failure.

FIG. 11 illustrates an example XML file 1100. In this implementation, an XML file example of a wireless extender auto-push is shown. XML is a suggested method to push the data, however, ether methods may also be used. In this disclosure, the access identifiers, PTK, and steer client MAC address are included in the auto push data.

Figure 12:
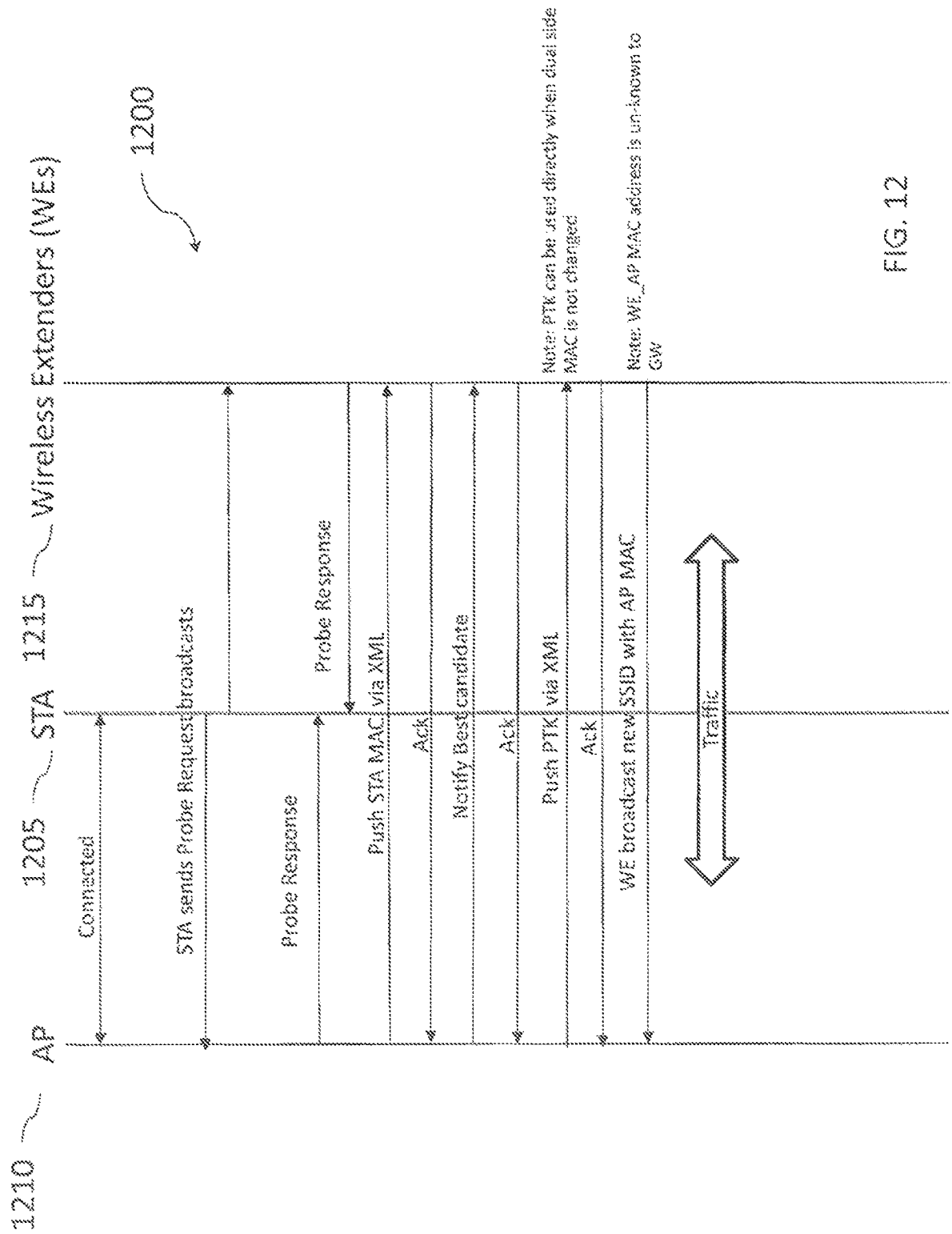
FIG. 12 illustrates a message flow diagram for steering in accordance with implementations of various techniques described herein.

FIG. 12 illustrates a message flow diagram for steering. Message flow diagram 1200 illustrates how steering of a client (STA 1205) from a gateway AP (AP 1210) to a qualified wireless extender 1215 is accomplished. Although the message flow of FIG. 12 describes an AP to wireless extender message flow, the present message flow may also be utilized in conjunction with AP to router and AP to Wi-Fi extender message flows. A connection between AP 1210 and client 1205 is established. The client 1205 sends probe request broadcasts to the AP 1210 and one or more wireless extenders. The AP 1210 and the one or more wireless extenders each send a probe response. The AP 1210 pushes the client MAC to the one or more wireless extenders via XML. Each of the wireless extenders 1215 responds to the AP 1210 with an acknowledgement. The AP 1210 notifies the best candidate of the one or more wireless extenders 1215. The wireless extender 1215 designated as the best candidate responds to the AP 1210 with an acknowledgement. The AP 1210 pushes a PTK to the best candidate wireless extender 1215 via XML. In one implementation, when a dual side MAC is not changed, PTK can be used directly. The best candidate wireless extender 1215 responds to the AP 1210 with an acknowledgement. The best candidate wireless extender 1215 broadcasts a new SSID with the AP 1210 MAC. In this implementation, the WE_AP MAC address is unknown to the gateway.

Figure 13:
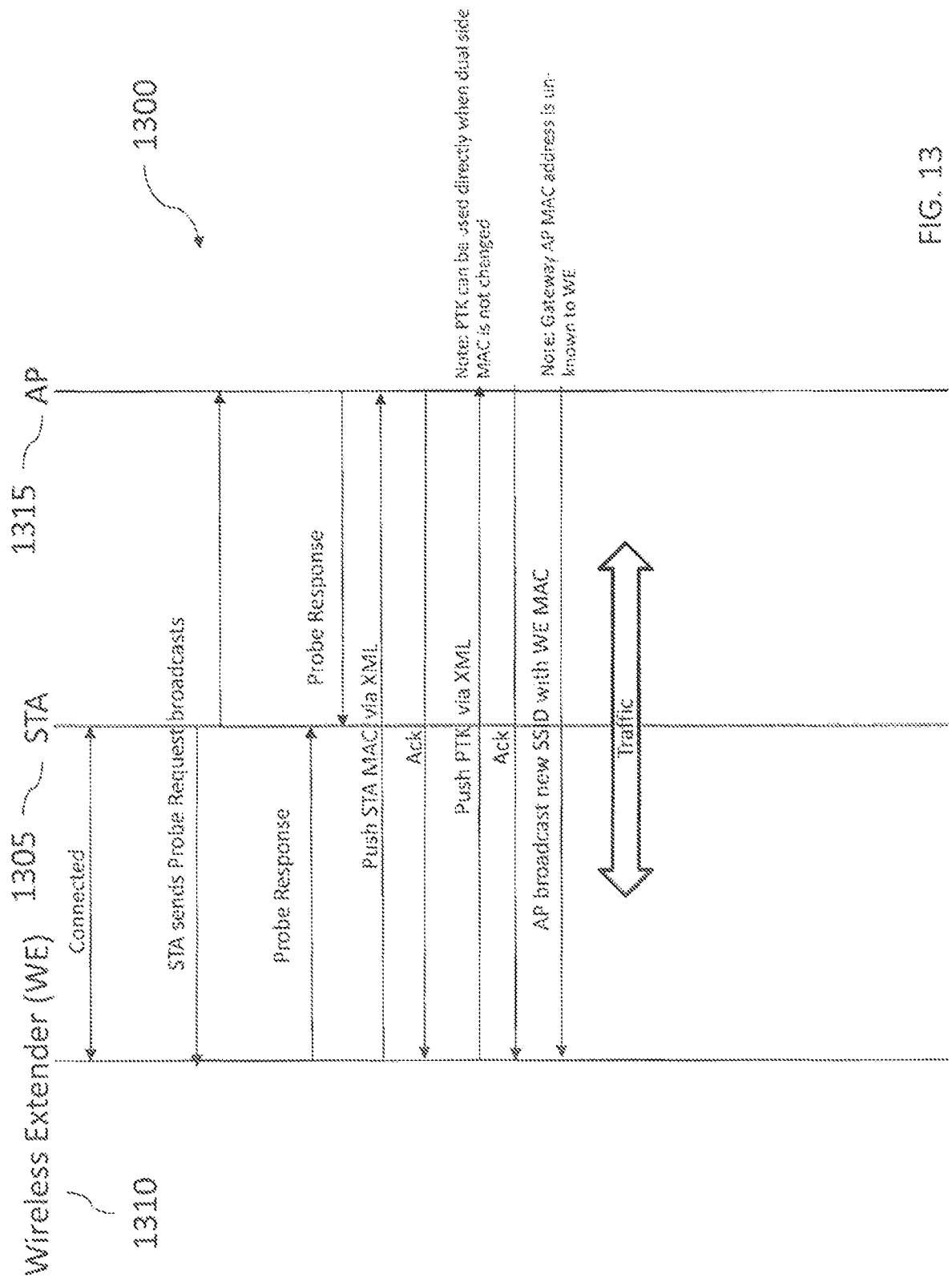
FIG. 13 illustrates a message flow diagram for steering in accordance with implementations of various techniques described herein.

FIG. 13 illustrates a message flow diagram for steering. Message flow diagram 1300 illustrates how steering of a client (STA 1305) from a wireless extender 1310 to a gateway AP (AP 1315) is accomplished. Although the message flow of FIG. 13 describes a wireless extender to AP message flow, the present message flow may be utilized in conjunction with router to AP and Wi-Fi extender to AP message flows. A connection between wireless extender 1310 and client 1305 is established. The client 1305 sends probe request broadcasts to the wireless extender 1310 and the AP 1315. The wireless extender 1310 and the AP 1315 each send a probe response. The wireless extender 1310 pushes the client MAC to the AP 1315 via XML. The AP 1315 responds to the wireless extender 1310 with an acknowledgement. The wireless extender 1310 pushes a PTK to the AP 1315 via XML. In one implementation, when a dual side MAC is not changed, PTK can be used directly. The AP 1315 responds to the wireless extender 1310 with an acknowledgement. The AP 1315 broadcasts a new SSID with the wireless extender 1310 MAC. In this implementation, the gateway AP MAC address is unknown to the wireless extender.

Figure 14:
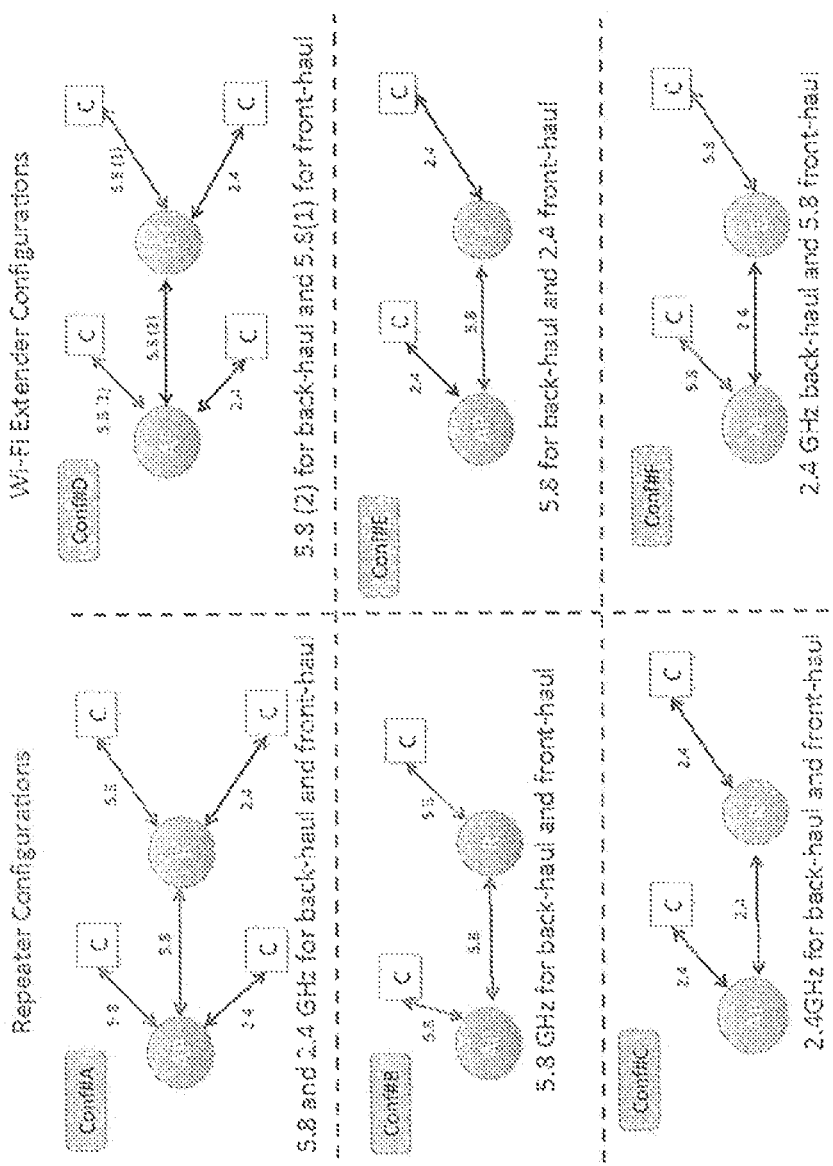
FIG. 14 shows various configurations where the methods of the present disclosure may be utilised to provide steering in accordance with implementations of various techniques described herein.

FIG. 14 shows various configurations where the methods of the present disclosure may be utilized to provide steering. Configurations having a gateway access point (AP), a repeater (R) and a plurality of clients (C) are shown in Conf #A, Conf #B, and Conf #C. In Conf #A, 5.8 GHz and 2.4 GHz links are used for back-haul and front-haul applications. In Conf #B, a 5.8 GHz link is used for back-haul and front-haul applications. In Conf #C, a 2.4 GHz link is used for back-haul and front-haul applications. Configurations having an AP, a Wi-Fi extender (E) and a plurality of clients (C) are shown in Conf #D, Conf #E, and Conf #F. In Conf #D, a first link 5.8 GHz (1) is used for front-haul applications and a second link 5.8 GHz (2) is used for back-haul applications. In Conf #E, a 5.8 GHz link is used for back-haul applications and a 2.4 GHz link is used for front-haul applications. In Conf #F, a 2.4 GHz link is used for back-haul applications and a 5.8 GHz link is used for front-haul applications.

Figure 15:
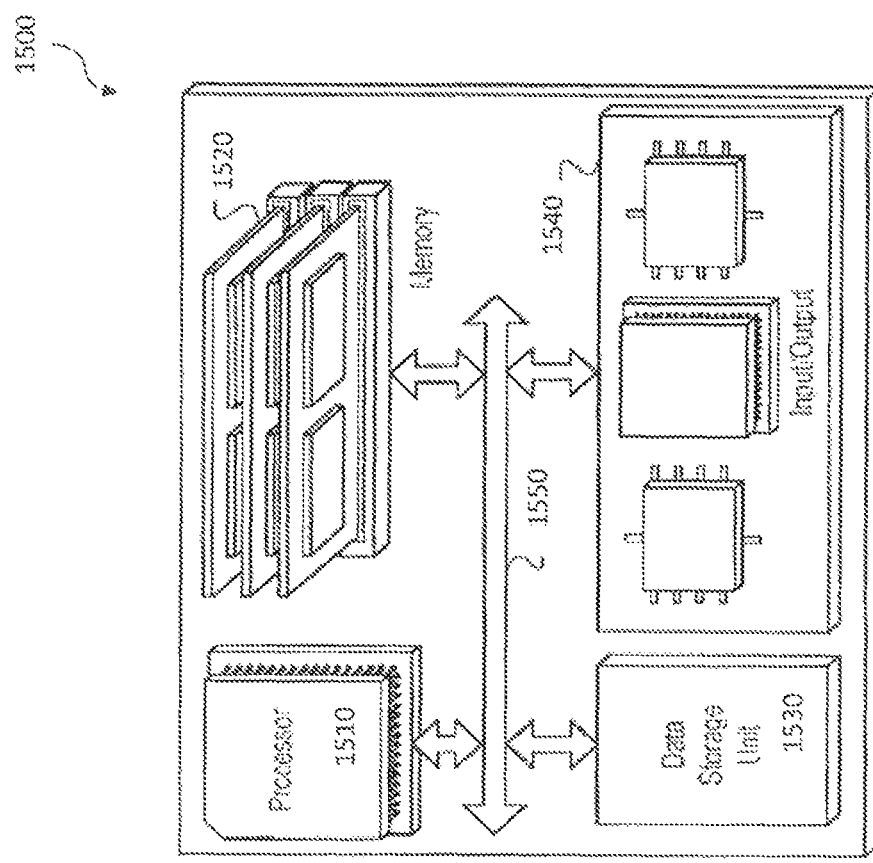
FIG. 15 illustrates a schematic diagram of a computing system in which the various technologies described herein may be incorporated and practiced.

FIG. 15 is a block diagram of a hardware configuration 1500 operable to provide steering for devices of a Wi-Fi network. The hardware configuration 1500 can include a processor 1510, a memory 1520, a storage device 1530, and an input/output device 1540. Each of the components 1510, 1520, 1530, and 1540 can, for example, be interconnected using a system bus 1550. The processor 1510 can be capable of processing instructions for execution within the hardware configuration 1500. In one implementation, the processor 1510 can be a single-threaded processor. In another implementation, the processor 1510 can be a multi-threaded processor. The processor 1510 can be capable of processing instructions stored in the memory 1520 or on the storage device 1530.

The memory 1520 can store information within the hardware configuration 1500. In one implementation, the memory 1520 can be a computer-readable medium. In one implementation, the memory 1520 can be a volatile memory unit. In another implementation, the memory 1520 can be a non-volatile memory unit.

In some implementations, the storage device 1530 can be capable of providing mass storage for the hardware configuration 1500. In one implementation, the storage device 1530 can be a computer-readable medium. In various different implementations, the storage device 1530 can, for example, include a hard disk device/drive, an optical disk device, flash memory or some other large capacity storage device. In other implementations, the storage device 1530 can be a device external to the hardware configuration 1500.

The input/output device 1540 provides input/output operations for the hardware configuration 1500. In one implementation, the input/output device 1540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, and/or data services to a display device (e.g., television 110 of FIG. 1, mobile device, tablet, computer, etc.). In embodiments, the input/output device can include driver devices configured to send communications to, and receive communications from one or more networks (e.g., local network, subscriber network 120 of FIG. 1, WAN 115 of FIG. 1, Home/Wi-Fi network of system 200, etc.).

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CO ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The discussion above is directed to certain specific implementations, it is to be understood that the discussion above is only for the purpose of enabling a person with ordinary skill in the art to make and use any subject matter defined now or later by the patent "claims" found in any issued patent herein.

It is specifically intended that the claimed Invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method by an access point for providing steering for a client of a Wi-Fi network, comprising:
    comparing an idle timer of the client to a steering idle timer;
    pushing a media access control (MAC) address of the client to one or more wireless extenders based on the comparison;
    receiving in response to the push a received signal strength indicator (RSSI) information;
    determining from the one or more wireless extenders one or more qualified wireless extenders based on the RSSI information;

choosing from the one or more qualified wireless extenders a candidate wireless extender; and
starting the steering, wherein starting the steering comprises:
sending to the candidate wireless extender a pairwise transient key (PTK) of the client to bypass a four-way handshake process for seamless association, wherein the candidate wireless extender broadcasts a new service set identifier (SSID) by using a MAC address of the access point; and
determining that the client is capable of being steered to the candidate wireless extender.

2. The method of claim 1, wherein pushing the MAC address of the client to one or more wireless extenders comprises using an auto-push procedure.

3. The method of claim 1, wherein starting the steering comprises:
deleting the client from a client list, adding the client into a block list, and updating a last steering time based on the client being capable of being steered to the candidate wireless extender.

4. The method of claim 1, wherein the steering idle timer is defined on a per user basis.

5. The method of claim 1, wherein starting the steering comprises:
sending an address resolution protocol (ARP) request to update an ARP subsystem interface.

6. The method of claim 1, further comprising stopping handling traffic of the client.

7. The method of claim 1, further comprising receiving an acknowledgement from the candidate wireless extender.

8. An access point for providing steering for a client of a Wi-Fi network, comprising:
a memory storing one or more computer-readable instructions; and
a processor configured to execute the one or more computer-readable instructions to:
compare an idle timer of the client to a steering idle timer;
push a media access control (MAC) address of the client to one or more wireless extenders based on the comparison;
receive in response to the push a received signal strength indicator (RSSI);
determine from the one or more wireless extenders one or more qualified wireless extenders based on the RSSI information;
choose from the one or more qualified wireless extenders a candidate wireless extender; and
start the steering, wherein starting the steering comprises:
sending to the candidate wireless extender a pairwise transient key (PTK) of the client to bypass a four-way handshake process for seamless association, wherein the candidate wireless extender broadcasts a new service set identifier (SSID) by using a MAC address of the access point; and
determining that the client is capable of being steered to the candidate wireless extender.

9. The access point of claim 8, wherein pushing the MAC address of the client to one or more wireless extenders comprises using an auto-push procedure.

10. The access point of claim 8, wherein starting the steering comprises:
deleting the client from a client list, adding the client into a block list, and updating a last steering time based on the client being capable of being steered to the candidate wireless extender.

11. The access point of claim 8, wherein the steering idle timer is defined on a per user basis.

12. The access point of claim 8, wherein starting the steering comprises:
sending an address resolution protocol (ARP) request to update an ARP subsystem interface.

13. The access point of claim 8, wherein the processor is further configured to execute the one or more computer-readable instructions to stop handling traffic of the client.

14. The access point of claim 8, wherein the processor is further configured to receive an acknowledgement from the candidate wireless extender.

15. A non-transitory computer-readable medium of an access point storing one or more computer-readable instructions for providing steering of a client of a Wi-Fi network, the one or more computer-readable instructions that when executed by a processor of the access point cause the access point to perform one or more operations comprising:
comparing an idle timer of the client to a steering idle timer;
pushing a media access control (MAC) address of the client to one or more wireless extenders based on the comparison;
receiving in response to the push a received signal strength indicator (RSSI) information;
determining from the one or more wireless extenders one or more qualified wireless extenders based on the RSSI information;
choosing from the one or more qualified wireless extenders a candidate wireless extender; and
starting the steering, wherein starting the steering comprises:
sending to the candidate wireless extender a pairwise transient key (PTK) of the client to bypass a four-way handshake process for seamless association, wherein the candidate wireless extender broadcasts a new service set identifier (SSID) by using a MAC address of the access point; and
determining that the client is capable of being steered to the candidate wireless extender.

16. The non-transitory computer-readable medium of claim 15, wherein pushing the MAC address of the client to one or more wireless extenders comprises using an auto-push procedure.

17. The non-transitory computer-readable medium of claim 15, wherein starting the steering comprises:
deleting the client from a client list, adding the client into a block list, and updating a last steering time based on the client being capable of being steered to the candidate wireless extender.

18. The non-transitory computer-readable medium of claim 15, wherein the steering idle timer is defined on a per user basis.

19. The non-transitory computer-readable medium of claim 15, wherein starting the steering comprises:
sending an address resolution protocol (ARP) request to update an ARP subsystem interface.

20. The non-transitory computer-readable medium of claim 15, wherein the one or more computer-readable instructions when executed by the processor further cause the access point to perform one or more further operations comprising at least one of:
stopping handling traffic of the client; and receiving an acknowledgement form the candidate wireless extender.

* * * * *